United States Patent Office 3,547,860
Patented Dec. 15, 1970

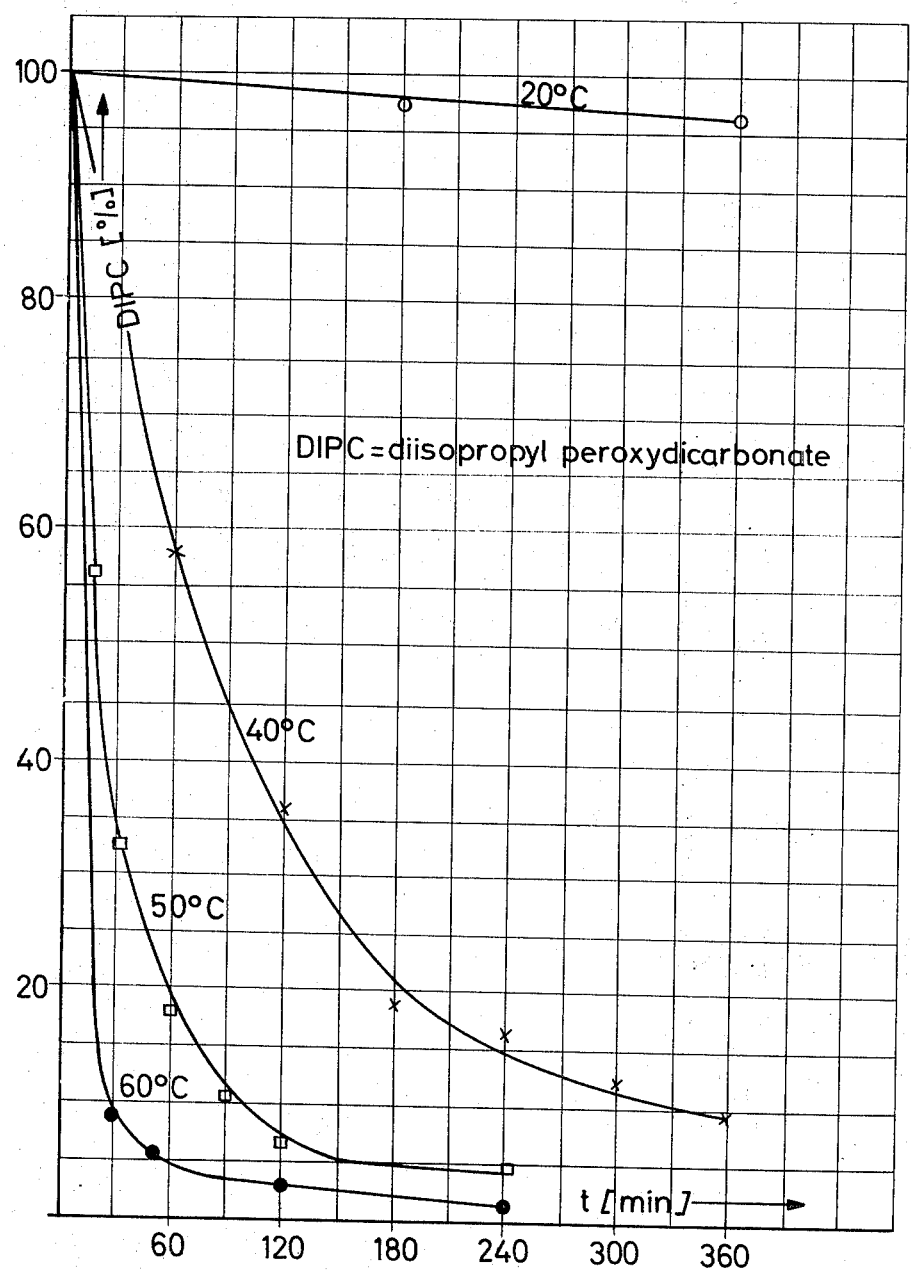

3,547,860
PROCESS FOR POLYMERIZING VINYL ESTERS IN SOLVENTS
Gerhard Roh, Hofheim, Taunus, and Michael Lederer, Frankfurt am Main, Germany, assignors to Farbwerke Hoechst Aktiengesellschaft vormals Meister Lucius & Bruning, Frankfurt am Main, Germany, a corporation of Germany
Continuation-in-part of application Ser. No. 445,346, Apr. 5, 1965. This application Feb. 14, 1969, Ser. No. 799,475
Claims priority, application Germany, Apr. 15, 1964, F 42,611
Int. Cl. C08f 3/54; C08c 11/28, 11/36
U.S. Cl. 260—89.1                                   4 Claims

ABSTRACT OF THE DISCLOSURE

A process has been provided for solvent polymerization of vinyl esters whereby aliphatic diesters and cyclic diesters of peroxydicarbonic acid are used in combination with specific solvents. A representative peroxydicarbonate is diisopropyl peroxydicarbonate while a suitable solvent therefor is hexane. The temperatures employed are within the range of 20° to 90° C. By practicing this process, high monomer conversion rates are obtained as well as polyvinyl esters are prepared which have a narrow distribution of molecular weight.

---

The present application is a continuation-in-part application of application Ser. No. 445,346, filed Apr. 5, 1965, now abandoned, and relates to a process for polymerizing vinyl esters in solution in the presence of peroxydicarbonates as catalysts, using solvents having a decomposing action on the catalyst. By hydrolysis of the polyvinyl esters obtained polyvinyl alcohols can be produced having a high or low molecular weight and a narrow molecular weight distribution.

It is known to polymerize vinyl esters in the presence of solvents, for example alcohols, esters and ketones. As catalysts there are used, for example, benzoyl peroxide or azodiisobutyronitrile. When polymers are to be produced which have only a few branchings, the polymerization must be interrupted when 50 to 80% of the monomer have been reacted; hence the aforesaid catalysts have the drawback that they must be rendered inactive. This may be done, for example, by adding a reducing agent or an interrupting agent (stopper). In any case, substances get into the polymer solution which detrimentally affect the quality of the polymers and of the polyvinyl alcohols made therefrom (for example as regards cross-linking, coloration and odor).

It is likewise known from U.S. Pats. 3,036,054, 2,370,-588 and 2,464,062 to polymerize vinyl acetate in the absence of solvents, that is to say in substance or by a bead polymerization process, with the aid of peroxydicarbonates as catalysts.

In the discontinuous process described in U.S. Pat. 3,036,054 the catalyst is destroyed by the action of heat. The polymerization is continued until the reaction temperature becomes stable and preferably for about 30 minutes thereafter. Important industrial disadvantages of the aforesaid process reside in that it can only be carried out in discontinuous manner and that for the production of polyvinyl alcohols the polyvinyl acetate beads must be separated and dissolved.

Moreover, it is known that peroxydicarbonates are very unstable. Diethyl-peroxydicarbonate decomposes spontaneously in substance at −10° C. while the corresponding diisopropyl compound decomposes at 12° C. Solutions of peroxydicarbonates in definite solvents, for example in toluene, halogen-containing solvents and aliphatic hydrocarbons are distinguished by a better stability, for example at room temperature. Solutions in other solvents, such as carboxylic acids, esters, and above all in alcohols, for example isopropanol or methanol, readily decompose. In this connection reference is made to the accompanying curve of decomposition of isopropyl-peroxydicarbonate in methanol.

In view of the foregoing, it could not be expected that the polymerization of vinyl esters in the said solvents, above all in alcohols, using peroxydicarbonates as catalysts, could be realized on an industrial scale with satisfactory results.

It has surprisingly been found that vinyl esters can be homopolymerized, using an aliphatic or cyclic diester of peroxydicarbonic acid as catalyst and in the presence of solvents without the aforesaid drawbacks being encountered, until the desired degree of conversion is obtained when solvents are used which have a decomposing action on the peroxydicarbonates at the polymerization temperature. It is especially advantageous to conduct the polymerization in semicontinuous manner or in continuous manner.

Suitable solvents to be used in the process of the invention are aliphatic alcohols with 1 to 20 and preferably 1 to 5 carbon atoms, such as methanol, ethanol, n-propanol, iso-propanol, butanols and amyl alcohols, furthermore esterification products of the aforesaid alcohols with aliphatic carboxylic acids with 1 to 20 carbon atoms. Still further, there can be used as solvents aliphatic carboxylic acids with 1 to 10 carbon atoms, for example formic acid, acetic acid, and propionic acid. The solvents are used either alone or in admixture with one another in an amount of 2 to 100%, and preferably 20 to 80%, calculated on the vinyl ester used.

As suitable peroxydicarbonate catalysts that can be used in the process of the invention there may be mentioned by way of example the diethyl ester, diisopropyl ester, dichloroisopropyl ester, the dibenzyl ester and/or the dicyclohexyl ester of peroxydicarbonic acid. The peroxydicarbonates are generally used in an amount of 0.005 to 0.5%, preferably 0.01 to 0.3%, calculated on the amount of monomeric vinyl ester used. It is particularly advantageous to use diisopropyl peroxydicarbonate.

It has likewise been found that with the use of peroxydicarbonates dissolved in aliphatic hydrocarbons with 5 to 12 and preferably 6 to 8 carbon atoms the polymerization of vinyl esters, for example vinyl acetate, yields a higher degree of conversion in the same unit of time than a polymerization accomplished with a solution of the peroxydicarbonates in toluene or carbon tetrachloride.

Vinyl esters which are especially suitable for being polymerized by the process according to the invention are, for example, the vinyl esters of low molecular weight carboxylic acids, for example the vinyl esters of formic acid, acetic acid, propionic acid and butyric acid.

In general, the polymerization temperature shall vary between 20 and 90° C. and advantageously between 40 and 80° C. It is advantageous to conduct the polymerization at the boiling temperature of the azeotropic mixture of vinyl ester and solvent.

The conversion of the vinyl ester to polyvinyl ester as well as the degree of polymerization of the polyvinyl ester obtained depend on the type and the amount of solvent or solvent mixture, the polymerization temperature and the amount of catalyst used. Since the peroxydicarbonate is completely consumed after a certain time the conversion of the vinyl ester to polyvinyl ester can be controlled by varying the amount of catalyst used.

By variation of the amount of solvent and the amount of catalyst used and of the polymerization temperature, polyvinyl esters are produced the K values (according to Fikentscher) of which are in the range of from 20 to 90. A very advantageous characteristic of the polyvinyl esters prepared by the process of the invention is their very narrow distribution of the molecular weight. The process according to the invention offers the further advantage that polyvinyl esters can be produced having a high K value. Polyvinyl esters prepared by polymerization in solution usually have a K value of at most 50.

The unreacted vinyl ester can be readily recovered by distillation in the form of an azeotropic mixture with the solvent and re-used for polymerization. During distillation a polymerization of the vinyl ester does not take place because the catalyst is completely consumed.

The polymerization as well as the distillation can be carried out in continuous manner. The polyvinyl esters prepared by the process according to the invention are distinguished by the fact that the macromolecules are unbranched or have very few branchings only and are free from detrimental contaminations. Consequently, they are excellently suitable as starting material for the manufacture of polyvinyl alcohol, the degree of polymerization of which is practically equal to that of the starting polyvinyl ester, in other words during transformation into polyvinyl alcohol a degradation does not take place, which property is of great industrial importance.

The following examples serve to illustrate the invention but they are not intended to limit it thereto, the parts being by weight unless otherwise stated.

EXAMPLE 1

A 2 liter glass flask provided with stirrer and reflux condenser was charged with a mixture of 80 parts of vinyl acetate and 20 parts of methanol and the mixture was heated to 55° C. while stirring. 0.01% of diisopropyl peroxydicarbonate, calculated on the amount of vinyl acetate used, was added in the form of a 50% solution in hexane. The mixture was maintained at an internal temperature of 60° C. (reflux temperature). The reaction mixture became slowly viscous. After 2 hours, 50% of the vinyl acetate had been converted to polyvinyl acetate.

The unreacted vinyl ester was removed by distillation with vaporous methanol. The mixture of vinyl acetate and methanol obtained could be re-used in the polymerization.

The polyvinyl acetate obtained in the form of a solution in methanol was subjected to alcoholysis in known manner by adding alkali. The polyvinyl alcohol thus obtained contained 1% of acetyl and had a K value of 75 (according to Fikentscher). A 4% aqueous solution of the polyvinyl alcohol had a viscosity of 45 centipoises.

EXAMPLE 2

A vessel having a capacity of 400 parts by volume, provided with impeller, reflux condenser, jacket heating, thermometer and outlet tube for the polymer solution, was charged with 200 parts of a mixture consisting of 160 parts of vinyl acetate, 40 parts of methanol and 0.01%, calculated on the vinyl acetate used, of isopropyl peroxydicarbonate. The mixture was heated to an internal temperature of 60° C., while stirring, and maintained at said temperature for 3 hours. After that time about 50% of the vinyl acetate had been converted into polyvinyl acetate. Fresh polymerization mixture was then pumped into the vessel at the rate at which the polymer solution was discharged through the outlet tube so that the vessel always contained the same amount of reaction mixture.

In a series-connected packed column the excess of vinyl acetate was continuously distilled off from the polymer solution. The polymer solution was pumped into the upper part of the column and at the bottom methanol vapor was introduced and contacted in counter-current flow with the descending solution. At the head of the column a mixture of vinyl acetate and methanol was discharged which contained 60% of vinyl acetate, while at the bottom of the column methanolic polyvinyl acetate solution free from vinyl acetate was withdrawn having a solids content of 40%.

The methanolic solution of polyvinyl acetate was subjected to alcoholysis in known manner by the addition of alkali. The polyvinyl alcohol obtained had an acetyl content of less than 1% and a K value of 67 (according to Fikentscher). A 4% aqueous solution of the polyvinyl alcohol had a viscosity of 30 centipoises.

EXAMPLE 3

A 2 liter glass flask provided with stirrer and reflux condenser was charged with a mixture of 80 parts of vinyl acetate and 20 parts of methanol and the mixture was heated to 55° C. while stirring. 0.01% of diisopropyl peroxydicarbonate, calculated on the amount of vinyl acetate used, was added in the form of a 50% solution in hexane. The mixture was maintained at an internal temperature of 60° C. (reflux temperature). The reaction mixture became slowly viscous. After 2 hours, 50% of the vinyl acetate had been converted to polyvinyl acetate.

COMPARATIVE EXAMPLES 4 AND 5

The process of Example 3 was repeated with the exception that the diisopropyl peroxydicarbonate was used in the form of a 50% solution in (4) toluene and (5) carbon tetrachloride, respectively, instead of a solution in hexane. In both reactions after two hours only 15% of the vinyl acetate had been converted to polyvinyl acetate.

We claim:

1. A process for homopolymerizing vinyl esters in a solvent consisting essentially of carrying out the polymerization of vinyl esters at a temperature with in the range of 20° to 90° C. in at least one solvent selected from the group consisting of an aliphatic carboxylic acid of 1 to 10 carbon atoms, an aliphatic alcohol of 1 to 20 carbon atoms, and an esterification product of said alcohol with an aliphatic carboxylic acid of 1 to 20 carbon atoms while using as a sole catalyst a member selected from the group consisting of an aliphatic diester of a peroxydicarbonic acid and a cyclic diester of peroxydicarbonic acid in the form of a solution in an aliphatic hydrocarbon having 5 to 12 carbon atoms.

2. The process of claim 1 which consists essentially of carrying out the polymerization at a temperature from 40° to 80° C.

3. The process of claim 1 which consists essentially of carrying out the polymerization while using diisopropylperoxydicarbonate as the catalyst.

4. The process of claim 1, which consists essentially of carrying out the polymerization in the presence of 20 to 80% of solvent, calculated on the monomer used.

References Cited

UNITED STATES PATENTS

| | | | |
|---|---|---|---|
| 2,464,062 | 3/1949 | Strain | 260—80 |
| 3,268,496 | 8/1966 | Germain | 260—85.7 |

OTHER REFERENCES

Isopropyl Percarbonate, Columbia Southern Technical Bulletin, 1959, Columbia Southern Chem. Corp., pp. 1–3.

JOSEPH L. SCHOFER, Primary Examiner

C. A. HENDERSON, Jr., Assistant Examiner

U.S. Cl. X.R.

260—31.2, 33.4, 85.7, 91.3